United States Patent
Hockings et al.

(10) Patent No.: US 9,992,201 B2
(45) Date of Patent: *Jun. 5, 2018

(54) THREAT-AWARE PROVISIONING AND GOVERNANCE

(71) Applicant: International Business Machines Corporation, Armonk, NY (US)

(72) Inventors: Christopher J. Hockings, Burleigh Waters (AU); Dinesh T. Jain, Pune (IN); Rohit U. Satyanarayana, Mandarin Gardens (SG); Vincent C. Williams, Mission Viejo, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/691,520

(22) Filed: Aug. 30, 2017

(65) Prior Publication Data

US 2017/0366548 A1    Dec. 21, 2017

Related U.S. Application Data

(63) Continuation of application No. 15/385,177, filed on Dec. 20, 2016, now Pat. No. 9,762,582, which is a (Continued)

(51) Int. Cl.
*G06F 21/50*  (2013.01)
*H04L 29/06* (2006.01)

(52) U.S. Cl.
CPC .............. *H04L 63/10* (2013.01); *H04L 63/20* (2013.01)

(58) Field of Classification Search
CPC .......... H04L 63/10; H04L 63/20; H04L 63/14; H04L 63/105
See application file for complete search history.

(56) References Cited

U.S. PATENT DOCUMENTS 8,812,342 B2   8/2014   Barcelo et al.
9,021,594 B2   4/2015   Choi et al.
(Continued)

OTHER PUBLICATIONS

Hitachi, "Hitachi ID Identity Manager," www.http://hitachi-id.com/identity-manager, 2 pgs., last printed Oct. 19, 2015 1:21 PM, © Hitachi ID Systems, Inc. 2015.
(Continued)

*Primary Examiner* — Noura Zoubair
(74) *Attorney, Agent, or Firm* — Nathan M. Rau

(57) ABSTRACT

A management component of a computing system evaluates end-users, end-user devices, and user accounts for access to provisioned-resources of the computing system. The management component utilizes device compliance attributes to form a device risk vector associated with an end-user device. The management component further utilizes resource compliance attributes to form a resource risk vector associated with a provisioned-resource. The management component forms a policy vector utilizing compliance attributes included in a compliance policy. The management component compares the device and resource risk vectors to the policy vector to determine a threat vector, and uses the threat vector to evaluate the end-users, end-user devices, and user accounts for risk of security breach, damage to, and/or loss of components of the computing system.

1 Claim, 8 Drawing Sheets

Related U.S. Application Data continuation of application No. 15/156,594, filed on May 17, 2016.

(56) References Cited

U.S. PATENT DOCUMENTS

| | | | |
|---|---|---|---|
| 9,053,302 | B2 | 6/2015 | Sastry et al. |
| 9,436,820 | B1 | 9/2016 | Gleichauf et al. |
| 2013/0047253 | A1* | 2/2013 | Radhakrishnan ..... G06F 21/552 726/22 |
| 2015/0074390 | A1* | 3/2015 | Stoback .............. H04L 63/1483 713/156 |
| 2015/0281287 | A1* | 10/2015 | Gill ......................... G06F 21/55 726/1 |
| 2016/0021117 | A1 | 1/2016 | Harmon et al. |
| 2016/0088021 | A1 | 3/2016 | Jayanti Venkata et al. |

OTHER PUBLICATIONS

Oracle, "Oracle Identity Manager," http://www.oracle.com/technetwork/middleware/id-mgmt/overview/index-098451.html 3 pgs., last printed Oct. 19, 2015 1:22 PM.

Unknown, "Increase user productivity and business flexibility with user provisioning & identity management," CA Identity Manager (formerly CA IdentityMinder™), User Provisioning—CA Technologies, http://www.ca.com/in/securecenter/ca-identity-manager.aspx, 4 pgs., last printed Oct. 19, 2015 1:23 PM.

"IBM Security Identity Manager," IBM Software Products, printed Dec. 20, 2016, 2 pages. http://www-03.ibm.com/software/products/en/identity-manager.

Hockings et al., "Threat-Aware Provisioning and Governance," U.S. Appl. No. 15/156,594, filed May 17, 2016.

Hockings et al., "Threat-Aware Provisioning and Governance," U.S. Appl. No. 15/385,177, filed Dec. 20, 2016.

Accelerated Examination Support Document dated Dec. 19, 2016 for U.S. Appl. No. 15/385,177, 22 pages.

Hockings et al., "Threat-Aware Provisioning and Governance," U.S. Appl. No. 15/691,543, filed Aug. 30, 2017.

List of IBM Patents or Patent Applications Treated as Related, Signed Aug. 30, 2017, 2 pages.

\* cited by examiner

THREAT-AWARE PROVISIONING AND GOVERNANCE

BACKGROUND

The present disclosure relates to computing system identity management and governance, and more specifically, to operations of identity and governance systems that provision and monitor access levels for end-users accessing resources of a computing system.

SUMMARY

According to the present disclosure, a computing system includes a provisioned-resource accessed by an end-user and a method for managing the provisioned resource. The provisioned-resource is accessed by an end-user, the end-user is associated with a user account, and the end-user uses an end-user device to access the computing system or the provisioned-resource. According to the disclosure, the method includes a device compliance status associated with the end-user device and a resource compliance status associated with the provisioned-resource. The device compliance status includes at least one device risk attribute, which is an attribute of the end-user device, and the resource compliance status includes at least one resource compliance attribute, which is an attribute of the provisioned-resource.

The method further includes forming a device risk vector, a resource risk vector, a policy vector, and a threat vector. The device risk vector includes at least one of the device risk attributes, and the resource risk vector includes at least one of the resource compliance attributes. The policy vector includes a security compliance attribute, which represents an access risk boundary associated with an end-user device type accessing the provisioned-resource. The security compliance attribute is included in acceptable system security risk boundaries. The method forms the threat vector, at least in part, by comparing one or both of the device risk vector and the resource risk vector to the policy vector. The threat vector includes one or more of the device risk attributes, the resource risk attributes, and the security compliance attributes. The method further determines an access-level associated with access to the provisioned resource by one or more of the end-user, the end-user device, and the user account. The access level is based at least in part on the risk attributes included in the threat vector.

According to the disclosure, determining the access level is further included in an access management operation that includes provisioning the provisioned-resource to one or more of the end-user, end-user device, and the user account, and re-certifying one or more of the end-user, end-user device, and the user account to access the provisioned-resource. The access management operation is also included in determining whether access to the provisioned-resource by one or more of the end-user, end-user device, and the user account is within the acceptable security risk boundaries; suspending one or more of the end-user, end-user device, and the user account from access to the provisioned-resource; and determining organizational role classifications associated with one or more of the end-user, end-user device, and the user account. Also, according to the disclosure, a provisioned-resource is one or more of access to the computing system, a resource of the computing system, or a service of the computing system.

According to aspects of the disclosure a computer program product can embody features of the disclosure. According to other aspects of the disclosure a system comprising a computing system, a provisioned-resource included in the computing system, and an end-user device, is configured to embody the disclosure. The computing system includes a computing device having a processor and a memory in communication with the processor.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
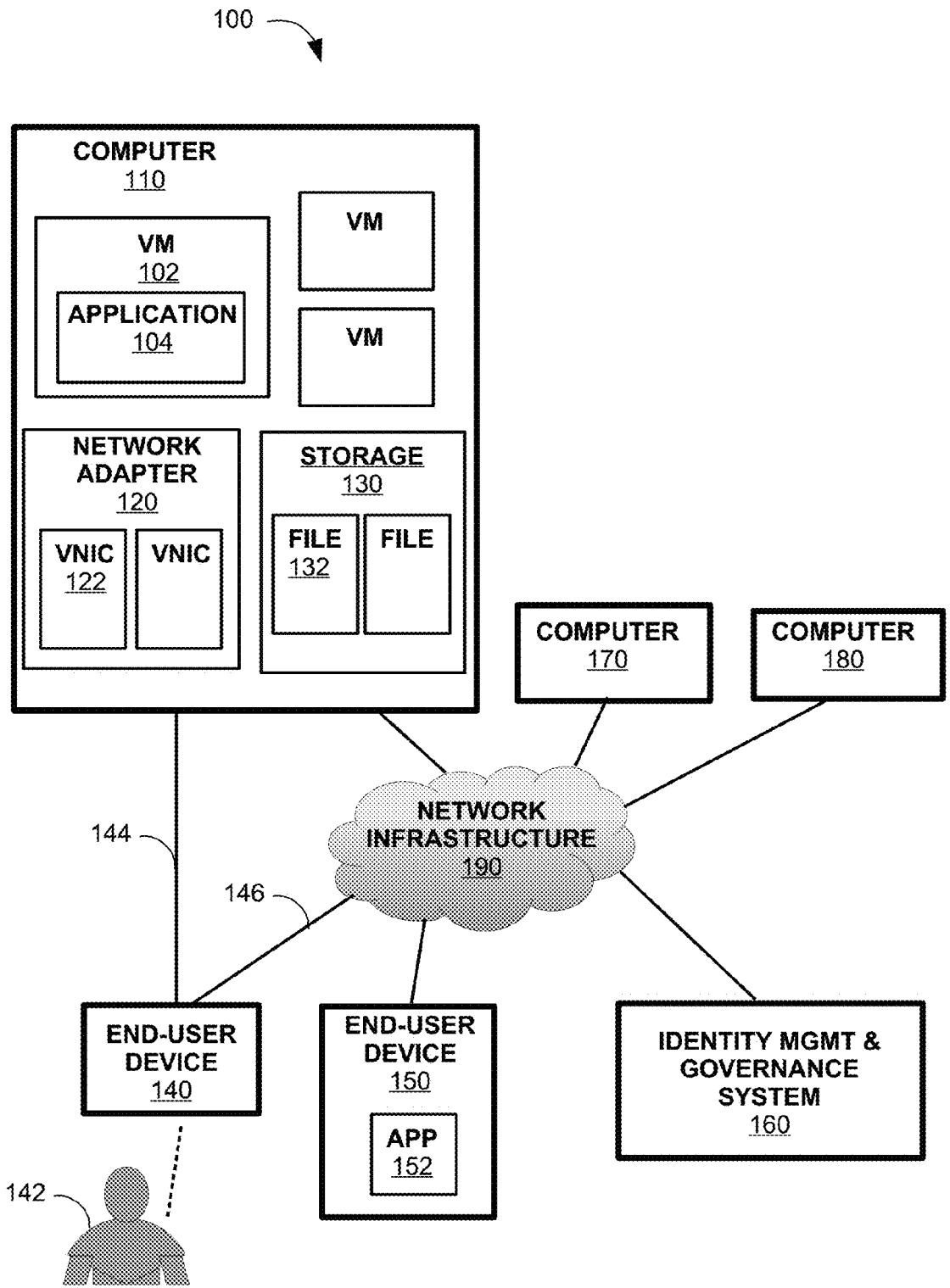
FIG. 1 is a block diagram that depicts an example computing system utilizing an identity management and governance system, according to embodiments of the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to identity and governance systems for managing access to resources of a computing system. More particular aspects relate to determining compliance status of an end-user device, compliance status of a resource, and forming a threat vector. A threat vector can incorporate components of the compliance status of one or both of the end-user device and a resource to represent possible security or damage risk to a computing system or a component thereof. In an aspect of the disclosure, the threat vector includes components of one or both of the end-user device and the resource compliance status that are not in conformance with compliance, or risk, attributes of a compliance policy governing end-user, or end-user device, access to resources of the computing system.

According to features of the disclosure, identity management and governance operations utilize the threat vector to determine access levels associated with an end-user utilizing the end-user device to access the resource. According to other features of the disclosure, identity management and governance operations utilize the threat vector to generate a compliance alert associated with an end-user utilizing the end-user device to access the resource. While the present disclosure is not necessarily limited to such applications, various aspects of the disclosure may be appreciated through a discussion of various examples using this context.

Computing systems can include a variety of interconnected computers, storage devices, and network devices. Entities that own, or administer, a computing system, or elements thereof, can provide resources or services of the computing system, or access to the computing system, to "end-users". For example, a computing system can host virtual machines (VMs) and can provide use of and/or access to a VM, as a resource of the computing system, to an end-user. A computing system can provide storage, and/or perform programmed computer applications (e.g., as a service) for a business or for an employee or customer of a business and can provide use of, or access to the storage and/or applications, as a resource to an end-user. A computing system may allocate an end-user, as a resource of the system, a user-id, login access to the computing system, and/or a service or resource thereof. In the context of the disclosure, "resources" of a computing system encompasses computing system access, resources, and/or services provided to an end-user.

A business, an enterprise (e.g., a large business), or a computer service provider are examples of entities that can own or administer a computing system (hereinafter, "resource-provider") that provides resources, services, and/or computing system access to end-users. Resources used by an end-user can be any of a variety of components of the computing system, such as: computers, servers, and/or VMs; storage (e.g., disk or other media) or compute resources (e.g., a set of processors, or virtual processors), network resources (e.g., physical or virtual network connections or devices), particular applications (e.g., an analytical or reporting program), and/or particular computer files, or data sets, stored within the computing system. Services may include data transmission between an end-user and a data destination, data encryption/decryption, "cloud" storage (e.g., a data repository accessed through an enterprise network or the Internet), and/or accessing or executing computing applications within the computing system, such as financial programs, word processing programs, and other such applications. A resource can be the computing system itself, or can be access to the computing system in a particular manner.

In embodiments, an "end-user" can be any entity accessing and/or utilizing resources of the computing system. For example, end-users can be: human users, electronic or mechanical devices, laptops, desktops, server computers, or any other suitable computing devices. In some embodiments, an end-user can be a home appliance (e.g., a refrigerator, an audio and/or video system, a security system, a thermostat control, or a lighting control), or component thereof; a component of an automobile or motor vehicle; and programs (or, programmed "applications") executing in, or on, a computer, mobile device (e.g., tablet computer or smartphone), or other electronic device. An end-user can be a component of a computing system (e.g., a program executing on a component of the computing system) or may be connected by some device to the computing system or an element thereof.

An end-user can be an employee or customer of an enterprise that owns or operates the resource-provider computing system. An end-user can also be, for example, an application, a VM, or a program, which may execute on a component of, or within, the computing system, or may execute on a component of another computer or computing system in communication with the computing system. For example, an end-user can be a computer or a VM belonging to a customer of a resource-provider and executing an application to access a provisioned-resource of the resource-provider computing system.

End-users can access the computing system resources by means of one or more end-user devices. For example, a human end-user can utilize a laptop computer, a mobile phone (e.g., a "smartphone"), a particular Internet connection (e.g., an IP address associated with the user or an internet device), or a combination of these, as well as other devices that can communicate with or access the resource-provider computing system, or resources or services thereof.

End-user devices can be components of the computing system or can be connected to the computing system. For example, an end-user device can be computer or other electronic components of the computing system. A computer can host a virtual machine (VM, or another form of a virtualized computing environment, such as a Linux programming container) and the VM can be an end-user. An end-user device can be a server, desktop, or laptop computer, mobile device (e.g., a tablet computer or smartphone), or any other suitable handheld/stationary computing device connected to the computing system (e.g., by means of an intranet or the Internet). An end-user device can be a component of, for example, a machine (e.g., an automobile or a motor vehicle, an electronic device (which can further be a device included in, for example a wearable device such as a shoe, eyeglasses, or an article of clothing), or a home appliance.

For purposes of the disclosure, except where particularly noted otherwise, or contextually clear, hereinafter "end-user" refers collectively to an end-user and end-user devices associated with that end-user to access the computing system resources.

A resource-provider may associate an end-user with a "user account". A user account may record the identity and characteristics of an end-user, and may record the identity and characteristics of particular end-user devices the end-user employs to access the computing system, or resources or services of the computing system. A particular user account can be associated with a plurality of end-users, and the end-users can use a plurality of end-user devices to access the provisioned-resources of the computing system. For example, a user account can be shared by a group of human users, or a group of programs or devices that access or utilize the computing system, or a resource or service thereof.

Allocating computing system resources to a user account or end-user may be referred to as "provisioning" the resources, and the resources, correspondingly, referred to as "provisioned-resources". An end-user may be allocated (or, granted) exclusive use of a provisioned-resource, or may share a provisioned-resource with other end-users, or other functions or components of the provisioned-resource-provider computing system. An end-user or user account may be associated with an access-level to a provisioned-resource, and the various access levels associated with these may be recorded in or associated with the user account. An access level may determine, for example, access privileges or security levels associated with a provisioned-resource.

For example, an end-user may be provided read access to a file, or a storage volume, within the computing system but may not be provided write access to that same resource. An end-user may be provided with a VM, but the end-user's access to and use of that VM may be permitted to perform only certain functions and not others. For example, a VM may be provided as a provisioned-resource to enable the end-user to test an application, but the VM may not be permitted to connect to the computing system in a way that enables it to perform production (e.g., normal business processing for the enterprise) operations. In another example, a user account may permit an end-user (or a set of end-users, or end-user devices used by the end-users) to access only public, or only organizationally internal, resources of the computing system but may not permit access to organizationally confidential or sensitive information or resources.

An end-user, having access to a provisioned-resource may expose that resource, or other resources or components of the computing system, to damage or loss if the end-user violates the access-level granted the end-user with respect to that particular provisioned-resource. Using the example of a VM provided to an end-user for performing application testing, if the VM were to access the computing system so as to perform production operations (in violation of access-level permissions intended or granted), the application or testing functions may interfere with or corrupt approved and expected production operations. If the VM were to access other resources of the computing system, beyond those the VM was intended or granted permission to access, the VM may expose or corrupt enterprise information.

A provisioned-resource may require that an end-user device accessing the resource have installed particular versions (or, "patch levels" relating to a fixing, correcting, and/or updating a defect) of particular software (or, hardware). An end-user device may have installed an earlier (or, later) version or patch-level of that particular software (or, hardware). When accessing the provisioned-resource, or the computing system, using that particular software version the end-user device can interfere with the operations of the resource or computing system (e.g., cause unpredictable results of interoperations with elements of the resource and/or computing system), can damage the resource or the computing system (e.g., corrupt a file or data of the system as a result of an incompatibility between the earlier version and functions of the computing system), and/or can compromise the security of the resource or computing system (e.g., enable un-authorized access to the resource or computing system).

Alternatively, a provisioned-resource can have installed particular versions, or patch-levels, of particular software (or, hardware). In combination with versions or patch-levels of software (or, hardware) installed on an end-user device, the end-user device accessing the provisioned-resource or computing may interfere with the operations of the resource or computing system, may damage the resource or the computing system, or may compromise the security of the resource or computing system. A particular version or patch-level of software (or, hardware) can have, or exhibit, a particular "vulnerability" to erroneous or malicious operations. For example, a particular software version can be vulnerable to particular types of malicious software ("malware") attacks, such as a Denial of Service (DoS) or Trojan horse attacks. Software (or, hardware) having particular vulnerabilities can also pose a corresponding risk of damage or security exposure to provisioned-resources or the computing system. Accordingly, a "vulnerability" may be any weakness, bug, and/or flaw associated with hardware and/or software that permits an end-user device and/or provisioned-resource to be affected by malicious software.

Consequently, as part of managing access and use of provisioned-resources of the resource-provider computing system, a computing system (or, an entity administering a computing system) can employ an "identity and governance system" (IGS). An IGS can perform a variety of access management operations related to provisioned-resources. For example, an IGS can evaluate attributes of end-users or end-user devices as part of allocating resources to end-users provisioning resources to an end-user or user account. An IGS can certify, or re-certify, authority of end-users, end-user-devices, user accounts, or provisioned-resources for access to those resources.

An IGS can perform risk analysis operations to determine if a particular end-user, or end-user device, poses a security or damage risk to a provisioned-resource (or, to the computing system or other components thereof), and can deny or modify end-user or end-user device access-levels to a provisioned-resource or the computing system. An IGS can classify end-users according to a level of risk they (or, end-user devices they use) pose to a resource or the computing system. An IGS can perform, or participate, in "role mining" operations that associate an end-user with an operational role within an organization or entity accessing resources within the computing system, or in classifying accounts or provisioned-resources as compromised by an end-user device.

Computing system administrators may establish compliance policies with regard to characteristics, or "compliance attributes" of end-user devices or provisioned-resources, such as whether or not a device or resource is contaminated with or has been exposed to malware, which versions or patch-levels of particular software (or, hardware) is installed, and whether the installed software (or, hardware) has certain vulnerabilities. For example, a compliance policy can restrict an end-user device to particular versions, or patch levels, of an operating system or application program(s) used on an end-user device. A compliance policy can allow an end-user device to be a laptop but can prohibit an end-user using a mobile device, or can require that an end-user device be disabled for WIFI access while accessing a particular (or, possibly, all) provisioned-resource. An end-user device, or a provisioned-resource, that is not within such compliance policies, may be a source of risk for damage or loss of that resource in relation to an end-user accessing that resource.

In relation to such policies, an IGS can determine (or, generate) a compliance status for a particular end-user device, for each of a set of end-user devices associated with a particular end-user or end-user account, or for a particular provisioned-resource. The compliance status of the end-user devices and provisioned-resources can be used in combination with operations of an IGS, a human administrator, or both to generate a threat vector representing a level of risk of damage or loss to resource-provider computing system resources posed by an end-user device accessing a provisioned-resource. An IGS can utilize such a threat vector to determine an access-level that can then govern the ability of an end-user or end-user device to access a particular provisioned-resource, or to access the resource at a level corresponding within a boundary of risk acceptable within the objectives of administering the resource or the computing system.

Accordingly, the present disclosure describes a system and method to determine and utilize compliance status associated with each of an end-user device and a provisioned-resource in the operations of an IGS.

FIG. 1 illustrates a computing system 100 according to features of the disclosure. Computing system 100 includes a plurality of computers, end-user devices, computing system resources, and an IGS. Computer 110 is illustrative of a server computer that can be included in a computing system according to the features of the disclosure. Computer 110 includes virtual machines (VMs), such as VM 102, network adapter 120, and storage 130. In embodiments, a VM—or, virtualized resource—can be another form of virtualized computing environment, such as a Linux programming container or Free-BSD jail.

Elements of computing system 100 (e.g., computers 110, 170, and 180; end-user devices 140 and 150; and IGS 160) are illustrated as interconnected by means of network infrastructure 190. A network infrastructure can be, for example, a private intranet (e.g., a local or wide area network internal to a resource provider), Virtual Private Network (VPN) that can, for example, enable end-user access to a computing system from another network, or can be and/or include a public network, such as the Internet.

Elements of a computing system—including provisioned resources, end-user devices, and/or an IGS—can be embodied in part or entirely within a single computer, or within a variety of computers or electronic devices connected by other interconnection means (not shown), such as point-to-point connections, or I/O or other electronic or optical buses. In some embodiments, elements of a computing that are resources provided to an end-user can be elements of a cloud-computing environment. A cloud-computing environment can be an environment of, and/or include, a computing system that makes resources of the computing system (e.g., data storage, a computing infrastructure such as a VM, and/or a computing platform, such as an application environment) available to an end-user as, for example, virtual elements of the computing system.

A network adapter, such as network adapter 120, can provide physical network interfaces (e.g., a port of network adapter 120, not shown), and/or can provide virtual network interfaces (VNIC) formed from a subset of the resources of a physical network interface within the adapter. For example, network adapter 120 includes VNIC 122.

Storage within a computer, such as storage 130, can store data in various forms, which can include extents (not shown) or computer files, such as file 132. The VMs (or, other virtualized resources), network adapter or physical or VNIC interfaces, and the storage or files of computer 110 can be provisioned-resources that the computing system (or, system administrator) can then allocate, or grant access, to one or more end-users. A VM (or, a computer) can include an application program, such as application 104 in VM 102, and the application program can be a provisioned-resource. Computers 170 and 180 are components of computing system 100 that can also provide provisioned-resources (not shown). Computers 170 and 180 can be computers in the manner of computer 110, can be storage servers, or can be network devices, for example.

An end-user can be provisioned resources within the computing system. For example, end-user 142 can be a human (or, a device or program) end-user and can be provisioned resources such as VM 102, application program 104, VNIC 122, storage 130, or file 132 within computer 110. VM 102 can be, for example, a VM provisioned as an Infrastructure-as-a-Service (IaaS) resource. Application 104 can be, for example, a financial service provisioned to one or more end-users. Human user 142 can be provisioned a login access to computer 110. The human end-user can use end-user-device 140 to access those resources (or, to access provisioned-resources within computers 170 and/or 180). In another example, application 152 (or, a computer or device including application 152) can be an end-user, and can use end-user device 150 to access provisioned-resources within computer 110 (or, computers 170 and/or 180). Application 152 can be, for example, a program, a hardware element, or a combination or plurality thereof.

End-user device 140 can access the provisioned-resources utilizing a direct connection, such as 144, to computer 110, or by means of a connection, such as 146, to the network infrastructure. In some embodiments, an end-user device can communicate with a provisioned-resource by means of a proxy. For example, end-user 142 can be provisioned file 132 in storage 130 and can communicate with VM 102 by means of end-user device 140 connected to the Internet, as represented by network infrastructure 190. VM 102, in turn, can communicate with components (not shown) of computer 110, to act as a proxy for access by end-user device 140 to file 132.

Computing system 100 further includes IGS 160. An IGS can be a component of one or more computers included within a computing system (including computer 110 or other computers, such as computers 170 and 180) or can be a component of a computer in communication with components of a computing system. For example, IGS 160 is shown in communication with the other components of computing system 100 by means of the network 190. While IGS 160 is illustrated as a component of computing system 100, other embodiments can include an IGS in a computer, or in a component of a computing system, separate from computing system 100 and simply in communication with the components of computing system 100. For example, IGS 160 can be embodied in a computer belonging to a distinct computing system and connected by means of the internet to computer 110 or other components of a computing system that otherwise excludes IGS 160.

An IGS can be embodied in multiple components of a computing system, or computing systems, which interact to effect the operations of an IGS. For example, some components of an IGS can be implemented in computer 110, while other components can be implemented in computers 170 and/or 180. In some embodiments, an IGS can be embodied within each of multiple components of a computing system, and each IGS can perform all operations of an IGS, and can perform these operations for all end-users and provisioned-resources governed by the IGS. In other embodiments, an IGS included in one component of the computing system can perform all operations of an IGS for some end-users, or some provisioned-resources, and an IGS included in another component of the computing system can perform these operations for other end-users, or other provisioned-resources. In yet other embodiments, some functions of an IGS can be performed by an IGS in one component of the computing system while other functions of an IGS are performed by an IGS in other components.

Figure 2:
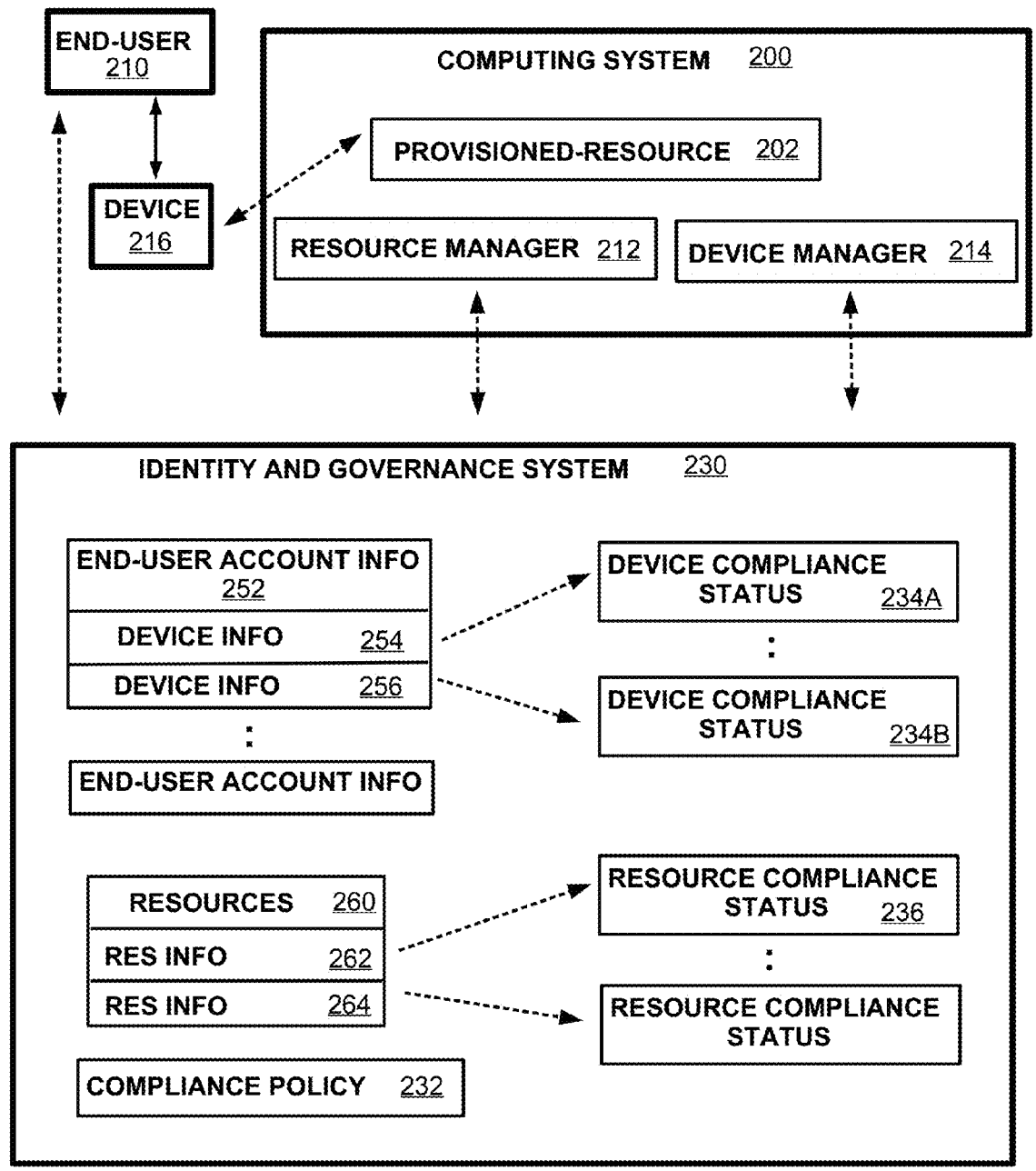
FIG. 2 is a block diagram that illustrates an example identity management and governance system, according to embodiments of the disclosure.

FIG. 2 illustrates an example IGS, 230, and a computing system, 200, that includes a provisioned resource. Computing system 200 can be, for example, a single computer, or can be a cluster, or network, of computers. Computer system 200 can be the computing system, or computer 110, of FIG.

1 and/or can be a component of, or provide, a cloud-computing environment. Components of a computing system (not shown) can include, for example, storage devices, network devices, and virtual machines. A provisioned-resource of a computing system can be any of the variety of resources, services, or access to the computing system, such as previously disclosed.

A computing system can have a resource management component, such as resource manager 212. A resource manager can be, for example, a program operating in a computer, or a VM, within a computing system. In embodiments, a resource manager may manage configuration, operations, and/or access by an end user of a provisioned resource. For example, resource manager 212 may manage access to provisioned-resource 202 by end-user 210.

A computing system can include a device manager, such as device manager 214. A device manager, in an embodiment, may manage end-user device access to the computing system (or, a provisioned-resource), for example. A device manager can, for example, interrogate, or inspect, end-user devices, and can determine various attributes of an end-user device, such as software or hardware versions or patch levels installed on the device, particular security vulnerabilities of the device (or a component of the device), and/or detect the presence of malware on an end-user device.

In embodiments, a resource manager, device manager, and/or provisioned-resource can be components of a single computer, or can be components of different computers in communication with each other. In some embodiments, a resource manager, device manager, and/or a provisioned-resource may be embodied in a plurality of computers (e.g., as a distributed embodiment of a resource manager, device manager, and/or provisioned-resource) within, or in communication with, a computing system.

A computing system can include an IGS, or can be in communication with an IGS. FIG. 2 depicts IGS 230 (only for purposes of illustration) as in communication with computing system 200 (or, components thereof, such as resource manager 212 or device manager 214). However, in other embodiments IGS 230, or components (or, functions) comprising IGS 230, can be components of computing system 200. In some embodiments, components of IGS 230 can be distributed among a plurality of computers within a computing system, or can be embodied in one or more computers in communication with computing system 200.

An end-user may interact with an IGS, or may be governed by an IGS, to access a computing system or a resource thereof. For example, end-user 210 may interact with IGS 230 to access a provisioned-resource of computing system 200, such as provisioned-resource 202. An end-user, in some embodiments, can use an end-user device to access a provisioned-resource. End-user 210 can use end-user device 216, for example, to access provisioned-resource 202.

In an embodiment, a device manager may interact with an IGS regarding access to a provisioned-resource, and/or regarding compliance attributes of an end-user device used to access a provisioned-resource. For example, device manager 214 can determine or monitor compliance attributes of one or more end-user devices (e.g., 216) end-user 210 uses to access provisioned-resource 202. Device manager 214 can provide those attributes to IGS 230.

In embodiments, a resource manager may interact with an IGS, for example to allocate or provision system access, resources, or services to end-users. For example, resource manager 212 can interact with IGS 230 to provision that resource 202 to end-users, or to enable end-user access to that resource. A resource manager can determine or monitor compliance attributes of provisioned-resources and can provide those attributes to an IGS as part of interacting with the IGS.

An IGS can perform, or participate in, a variety of identity and governance operations, such as provisioning resources to end-users, determining compliance risks of end-user devices and provisioned-resources, and determining or evaluating end-user access-levels associated with end-user device or provisioned-resource compliance status. An IGS can participate in certifying or re-certifying end-user access to provisioned-resources, or determining end-user roles, or role classifications, associated with end-user device or provisioned-resource compliance status.

An IGS can interact with an end-user, for example, to establish a user account (not shown). An IGS can collect, and can retain, information about an end-user, or devices used by an end-user to access a provisioned-resource. For example, IGS 230 includes end-user account information 252 for various end-users, which can include end-user 210. End-user account information 252 includes device info 254 and 256, which can be associated with or describe, for example, end-user device 216, as used by end-user 210 to access provisioned-resource 202. The device information can include the identity or attributes of particular provisioned-resources accessible to the end-user using that particular device. The device information can include particular access-levels governing an end-user's access to one or more provisioned-resources using that particular device.

An IGS (or, for example, an identity management function of an IGS) can include a compliance status for devices used by end-users to access a provisioned-resource. For example, IGS 230 includes device compliance status 234A, which can be associated with end-user device 216. End-user device 216 can be described, in turn, by device info 254. IGS 230 includes device compliance status associated with other end-user devices, such as device compliance status 234B associated with end-user devices (not shown) described by device info 256. In other embodiments, device compliance status can be included in, or available to, an IGS in some form other than by association with device information as illustrated in FIG. 2.

Compliance status can include attributes of an end-user device, or provisioned-resource, associated with risk of a security exposure or damage to the computing system or a component thereof. For example, compliance status for a device, or for a provisioned-resource can include attributes such as the presence (or, absence) of particular malware (e.g., viruses, Trojan horses, etc.), or particular software (or, hardware) versions and/or patch levels required (or, permitted or not permitted) to be installed on end-user devices and/or provisioned-resources. Compliance status for a device, or for a provisioned-resource can include (for example) vulnerabilities that present an acceptable (or, unacceptable) level of risk of damage or security exposure to a computing system.

An IGS can include, or access, a list (or, a database of some form) of provisioned-resources. For example, IGS 230 includes resource list (or, database) 260, which can further include information about various provisioned-resources, such as resource info 262 and 264. The resource information may identify or describe particular provisioned-resources of a computing system, and can include access-levels associated with a user account, end-user, end-user device, or combination of these, for particular end-users accessing the resource. For example, resource info 262 can describe provisioned-resource 202. Resource information can be associated with compliance status for a provisioned-resource. For example, resource info 262 is associated with resource compliance status 236, which can be associated with provisioned-resource 202. In other embodiments, resource compliance status may be included in, or available to, an IGS in some form other than by association with resource information as illustrated in FIG. 2.

An IGS may interact with a resource manager to provision a resource to an end-user. For example, IGS 230 may interact with resource manager 212 to allocate, for example, provisioned-resource 202 to end-user 210 (or, in some other manner, associate provisioned-resource 202 with end-user 210). In embodiments, an IGS, may determine, or may validate, an access-level for end-user 210, and/or end-user device 216, when end-user 210 uses end-user device 216 to access provisioned-resource 202.

Determining an access level can include evaluating compliance status of an end-user device (e.g., 216) or a provisioned resource (e.g., 202) or both, and can include comparing attributes of the compliance status with attributes of a compliance policy. For example, IGS 230 can utilize compliance policy 232 to determine an access level for end-user 210 (and/or end-user device 216) to access provisioned-resource 202.

A compliance attribute can represent particular malware, particular software (or, hardware) versions and/or patch levels installed on end-user devices and/or provisioned-resources, or particular vulnerabilities associated with end-user devices and/or provisioned-resources (e.g., associated with a particular device or resource type, or software or hardware installed on a device or resource). A compliance status can include compliance attributes, and a compliance policy can specify that particular device or provisioned-resource compliance attributes must be within (or, not within) an acceptable risk of damage or security exposure to a provisioned-resource, or other components, of a computing system.

A compliance policy can specify acceptable system security risk boundaries associated with compliance attributes. For example, a compliance policy can establish a range of software versions that are known to pose no security or damage risk to the computing system. A compliance policy can also establish, for example, a range of software versions that are known to pose a security or damage risk to the computing system and, therefore, may not be acceptable if detected on an end-user device or provisioned-resource. A compliance policy can include, for example, a list of malware programs that may pose a security or damage risk if detected on an end-user device or provisioned-resource. A compliance policy can include, in another example, a list of end-user device types, or device capabilities (e.g., WIFI-enabled or cellular) that are acceptable for an end-user to access a provisioned-resource. These various ranges, lists, or other means for determining or identifying particular attribute values, can thereby establish boundaries of acceptable (or, unacceptable) security or damage risk.

Continuing with the example of FIG. 2, in an embodiment IGS 230 (or one or more components thereof) may determine an access-level for end-user 210 to access the provisioned-resource 202. Provisioned-resource 202 can be associated with resource compliance status 236, end-user 210 can be associated with end-user device 216, and device compliance status 234A can be associated with end-user device 216. In making the determination, IGS 230 can evaluate device compliance status 234A, resource compliance status 236 (associated with the resource described by resource info 262), or both (e.g., in combination). Further, IGS 230 can compare attributes of device compliance status 234 or resources compliance status 236, or both, with attributes of compliance policy 232 to determine an access-level for end-user 210, end-user device 216, or a user account associated with end-user 210, to access provisioned-resource 202.

The components of FIG. 2, and associated disclosure thereof, are illustrative of components of a computing system and an IGS that can manage access by end-users, and/or end-user device, to provisioned-resources of the computing system. However, it would be apparent to one of ordinary skill in the art that, in any particular embodiment, various other components of a computing system or an IGS may substitute for, host, or augment, those components illustrated in FIG. 2 and that FIG. 2 is not limiting to embodiments of the disclosure.

Figure 3:
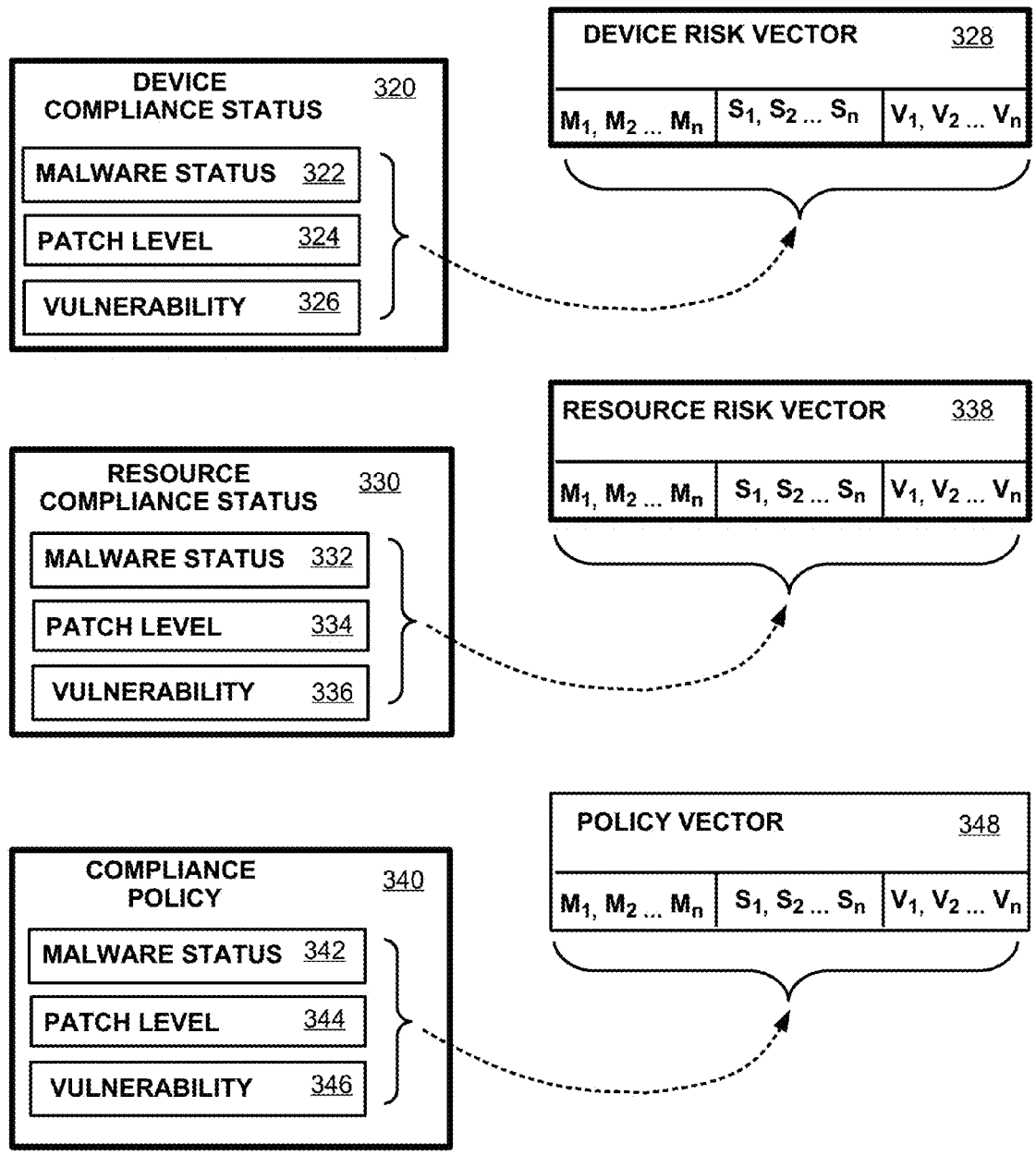
FIG. 3 is a block diagram that illustrates example compliance status and risk vectors, according to embodiments of the disclosure.

FIG. 3 illustrates example components of compliance status and a compliance policy, and risk and vectors formed to represent these attributes. According to aspects of the disclosure, risk and policy vectors can be used, for example, to determine access-levels or risk of damage or security exposure to a computing system (such as computing system 100 of FIG. 1 and/or computing system 200 of FIG. 2), or components thereof.

As illustrated in FIG. 3, device, and/or resource compliance status can include attributes of an end-user device, or provisioned-resource, respectively, such as compliance attributes disclosed in the example of FIG. 2. For example, device compliance status 320 includes compliance attributes malware status 322; patch level 324 (which can include, for example, software or hardware versions or levels); and vulnerabilities 326. The attributes included in device compliance status 320 can be all associated with a particular end-user device (e.g., end-user device 216 of FIG. 2). Resource compliance status 330 includes compliance attributes malware status 332; patch level 334 (which can include software or hardware versions or levels); and vulnerabilities 336. The attributes included in resource compliance status 330 can be all associated with a particular provisioned-resource of a computing system (e.g., provisioned-resource 202 of FIG. 2).

A compliance policy can specify particular values, or ranges of attribute values, of compliance attributes of an end-user device or provisioned resource that are within acceptable system security risk boundaries (e.g., that present acceptable, and/or unacceptable, security or damage risk to the computing system). For example, a compliance policy can specify that a version of a particular software program installed on an end-user device must be at or above a certain minimum version or patch-level. A compliance policy can specify that an end-user device must be, or must include, a hardware type or model that is within an accepted set of hardware types or models (e.g., a set of authorized laptop computer, or mobile device, types or models). A compliance policy can specify one or more software programs installed on an end-user device that are compatible with particular provisioned-resources of the computing system (e.g., compatible with one or more software programs utilized on, or with, a provisioned-resource). For example, compliance policy 340 includes compliance attributes malware status 342; patch level(s) 344 (which can include software or hardware versions or levels); and vulnerabilities 346, all associated with acceptable (or, unacceptable) security or damage risks of end-user (or, end-user device) access to the provisioned-resource(s) of the computing system.

Compliance status or policies can include other attributes not illustrated in FIG. 3. For example, device compliance status can include particular connection mechanisms, such as WIFI or Ethernet, which an end-user device may or, alternatively, may not be permitted to use to access a provisioned-resource. A compliance policy can include, for example, particular times of a day in which a particular (or, any) end-user may access a particular provisioned-resource. While these are illustrative of various characteristics or attributes of an end-user device or provisioned-resource that can be subject to a compliance policy, these are not intended to limit embodiments. Rather, it would be apparent to one of ordinary skill in the art that compliance status or policies can include various other attributes of end-user devices and provisioned-resources that relate to risk of damage to, loss of, or a security breach of a computing system, within the scope of the disclosure.

Continuing with the example of FIG. 3, a "risk vector" can be formed including one or more of the attributes included in a compliance status, and a "policy vector" can be formed including one or more "security compliance attributes" included in a compliance policy. For example, device risk vector 328 can be formed to include attributes of device compliance 320, resource risk vector 338 can be formed to include attributes of resource compliance 330, and policy vector 348 can be formed to include security compliance attributes of compliance policy 340.

In embodiments, risk or policy vectors can be formed, for example, to include a "-tuple", list, or other enumeration of particular attributes. For example, device risk vector 328 enumerates malware (or, unauthorized programs or hardware) attributes of device compliance status 320 as "M1, M2, . . . Mn", software (or, hardware) versions and patch level attributes as "S1, S2, . . . Sn", and vulnerability attributes as "V1, V2, . . . Vn". Each enumerated element within device risk vector 328 can correlate to a particular attribute, or attribute value, in the device compliance status 320.

Resource risk vector 338 can also be formed, for example, to enumerate malware, patch level, and vulnerability attributes included in resource compliance status 330 as "M1, M2, . . . Mn", software (or, hardware) versions and patch level attributes as "S1, S2, . . . Sn", and vulnerability attributes as "V1, V2, . . . Vn". Policy vector 348 can enumerate security compliance policy attributes, or attribute values, included in compliance policy 340, for example, as "M1, M2, . . . Mn", software (or, hardware) versions and patch level attributes as "S1, S2, . . . Sn", and vulnerability attributes as "V1, V2, . . . Vn".

An "attribute value", as used herein, can be any particular aspect of a particular attribute. An attribute value can be, for example, a name, a numerical value associated with an attribute (e.g., a minimum software version or hardware or type/model, or patch level of these), or any other characteristic or property of an attribute suitable for enumerating or characterizing that particular aspect in a compliance status or policy, or a risk or policy vector.

The value of a security compliance attribute, included (for example) in a policy vector, can represent access risk boundaries associated with a particular compliance attribute, (e.g., the risk associated with a particular end-user device accessing a particular provisioned-resource). A security compliance attribute can be a single value or can be a range of values. For example, "S1" of policy vector 348 (to choose on example attribute) can be a single software or patch version (e.g., "2.0"). In embodiments, a function of a computing system can determine, for example, that a device or resource software or patch version below this value (e.g., "1.0") is not within an acceptable system security risk. In some embodiments, a function of a computing system can determine, for example, that a device or resource software or patch version at or above this value (e.g., "2.1") is within the boundaries of an acceptable system security risk.

Alternatively, as another example, "S1" of policy vector 348 (to choose on example attribute) can be expressed as a range of acceptable versions or patch levels (or, a combination of these). A device or resource compliance software or patch version within this range can be determined to be within an acceptable level of risk to a computing system. An n-tuple can represent a range of particular attributes. For example, the -tuple "V1, V2, . . . VN" of policy vector 348 can represent, for example, a list of vulnerabilities that pose an unacceptable risk to a computing system. An access (e.g., an IGS) or resource management function of a computing system can determine that a device, or resource, that includes a vulnerability within this list is not within an acceptable level of risk (e.g., a security risk boundary) of the computing system.

Figure 4:
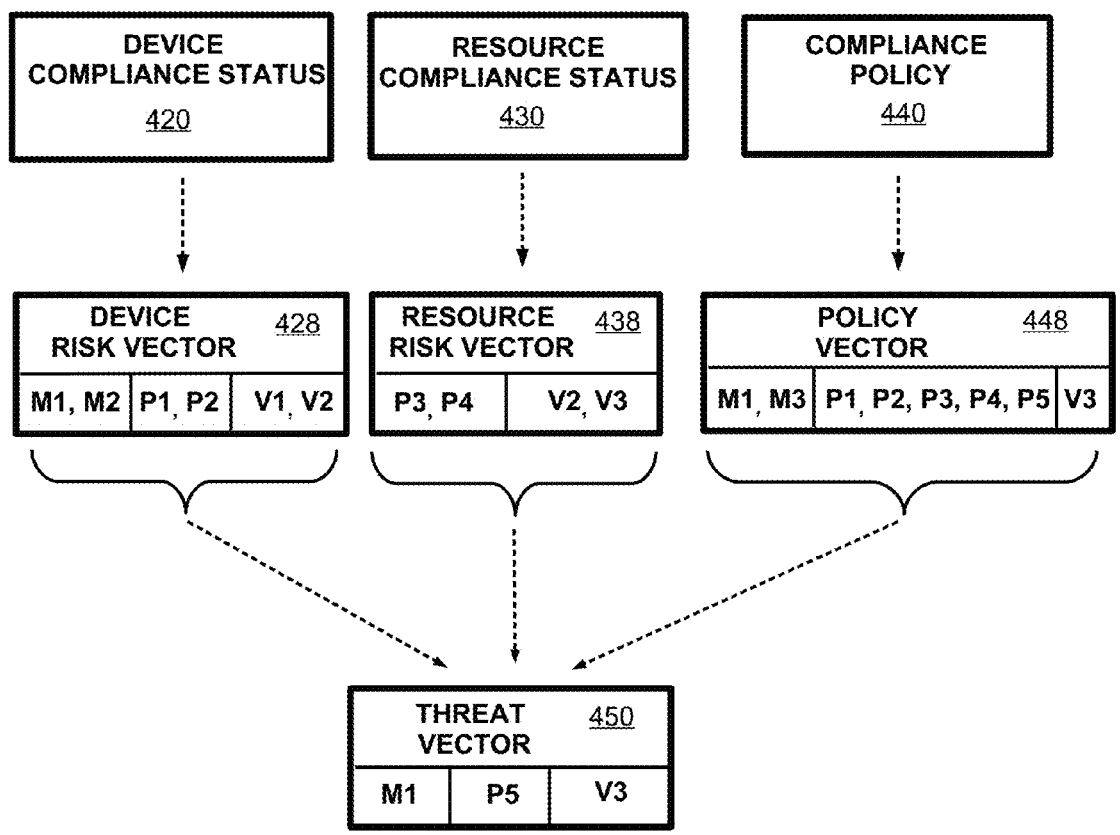
FIG. 4 is a block diagram that illustrates an example threat vector, according to embodiments of the disclosure.

In an embodiment, forming risk and policy vectors can assist an IGS in determining the risk, or "threat", of damage to, loss of, or security breach (for example) of an end-user accessing a provisioned resource using one or more end-user devices associated with the end-user (or, end-user account). FIG. 4 illustrates an example of forming a "threat vector" utilizing compliance status and security compliance attributes represented as risk and policy vectors. The threat vector can assist, for example, an IGS (or, a function of the computing system or system administrator, for example) in determining appropriate access levels that govern user account, end-user, and/or end-user device access to a provisioned-resource (such as a resource of computing system 100 of FIG. 1 and/or computer 200 of FIG. 2).

In embodiments, a function of a computing system can form device risk vector 428 using compliance attributes included in device compliance status 420, can form resource risk vector 438 using compliance attributes included in resource compliance status 430, and can form policy vector 448 using security compliance attributes included in compliance policy 440. A computing system function can compare, for example, one or both of device risk vector 428 and resource risk vector 438 to policy vector 448, to form threat vector 450. Various algorithms, formulas, or processes—such as comparing, matching, merging, or determining a subset of attributes included in a risk vector with respect to security compliance attributes included in a policy vector—can perform comparing the device and/or resource risk vectors to the policy vector.

For example, threat vector 450 can be formed by a combination of merging and set-subtraction of attribute values included in device risk vector 428, resource risk vector 438, and policy vector 448. Device risk vector 428 includes malware M1, and policy vector 448 includes malware M1 as a possible threat. Correspondingly, threat vector 450 includes malware M1 as a possible threat. Policy vector 448 includes patch level P5 as a required patch level for an end-user device and a provisioned resource associated with device compliance status 420 and resource compliance status 430, respectively. Neither device risk vector 428 nor resource risk vector 438 include patch level P5. Correspondingly, threat vector 450 includes patch level P5 as a possible threat.

Resource risk vector 438 includes vulnerabilities V2 and V3 as vulnerabilities of the resource associated with resource compliance status 430. Device risk vector 428 includes vulnerabilities V1 and V2. Policy vector 448 also includes vulnerability V3, but does not include vulnerabilities V1 and V2. Correspondingly, threat vector 450 includes vulnerability V3 as a possible threat, but does not include V1 and V2.

The foregoing manner of forming a threat vector, and as disclosed in the example of FIG. 4, is intended to aid in understanding the disclosure but does not limit embodiments. It would be apparent to one of ordinary skill in the art that embodiments can apply other methods to embody and/or compare compliance attributes of a compliance policy with compliance attributes of an end-user device and/or a provisioned-resource. It would be further apparent to one of ordinary skill in the art that embodiments can represent the results of such a comparison in a form other than a threat vector.

As previously disclosed, an end-user can utilize one or multiple end-user devices to access a particular provisioned-resource (or, a plurality of resources provisioned for access by that end-user, or the end-user's account). In embodiments, an end-user may register one or more end-user devices with an IGS, (or, for example, a device manager and registering end-user devices may be an aspect of associating an end-user with a user account on the computing system. Registering an end-user device with an IGS can include an end-user device communicating compliance attributes of the end-user device to an IGS, or an IGS determining compliance attributes of the end-user device. An IGS, or a component of a computing system, can record these attributes in a device compliance status. In embodiments, an IGS, or a component of an IGS or a computing system, can detect particular end-user devices accessing a computing system. Detecting an end-user device accessing the computing system can include determining or collecting compliance attributes of an end-user device, and can include identifying the end-user device and associating it with an end-user or user account.

Figure 5:
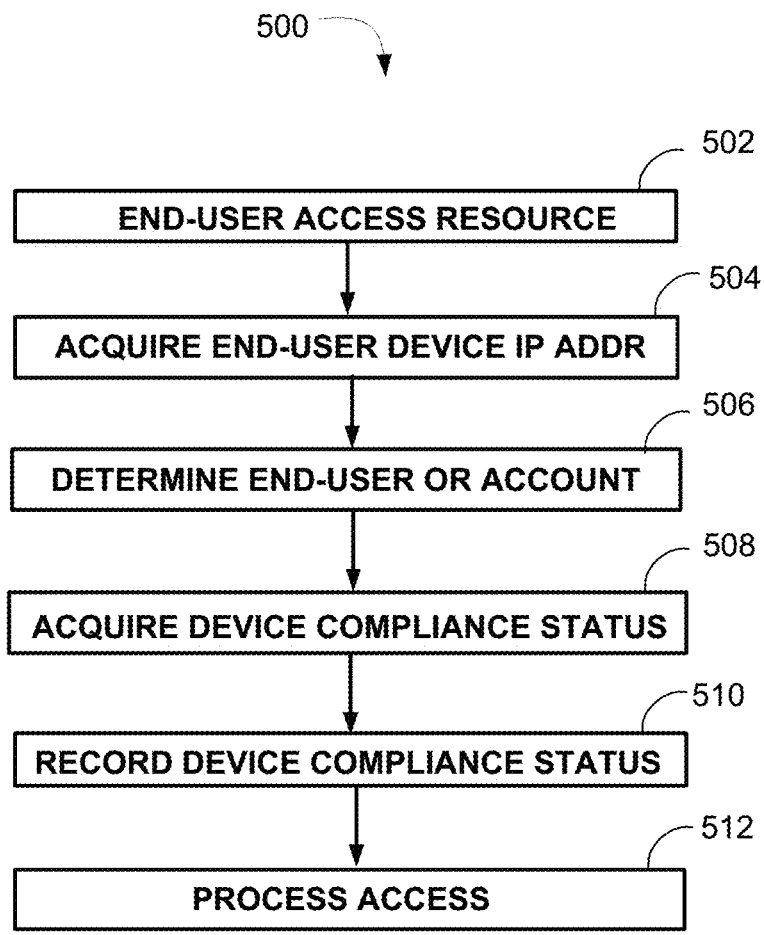
FIG. 5 is a flow diagram that depicts an example method to acquire end-user device compliance status, according to embodiments of the disclosure.

FIG. 5 illustrates an example method (500) of detecting an end-user accessing a computing system (such as computing system 100 of FIG. 1 and/or computer 200 of FIG. 2), or a provisioned-resource included in a computing system, and determining and recording compliance status of an end-user device used to access the computing system. For purposes of illustration, but not limiting to embodiments, the method is described as performed by an IGS associated with one or more provisioned resources of the computing system. However, it would be apparent to one of ordinary skill in the art that the method can be performed by another component of the computing system, or an element in communication, but not included within, the computing system. The method can be performed by a provisioned-resource, or a component of the computing system responsible for managing a provisioned-resource or end-user access thereto.

At 502, the IGS detects an end-user, using an end-user device, accessing the computing system, or a provisioned resource or service, of the computing system. The end-user may be associated with a user account and the user account may associate the end-user with provisioned-resources of the computing system. The end-user can access the computing system, for example, to login to a user account, and logging into the user account can be for purposes of requesting access to a provisioned-resource, or to establish access credentials or authorities to the computing system or a provisioned-resource. Alternatively, the access can be associated with the end-user attempting to access a provisioned-resource for which the end-user has previously been granted access.

In an embodiment, an end-user device can access the system over an Internet protocol (IP) network, which can be an intranet within the computing system, an extra-net that connects to the computing system, or, for example, the Internet. Accordingly, at 504 the IGS (or, for example, a component of the computing system) acquires the IP address of the end-user device. The IGS, at 506, then (for example) determines an end-user, or user account, using the IP address to associate the end-user device with the end-user or a user account. In other embodiments, an IGS can determine an end-user, or user account, associated with the end-user access, or end-user device used for that access, by other means in addition to or in lieu of using an acquired IP address. For example, an IGS can use a particular identifier for the end-user device (e.g., a serial number), or a particular identifier for an end-user (e.g., a user name), to associate the access with an end-user and/or user account. Correspondingly, an embodiment can omit 504 if the IP address of the end-user device is not the means to associate the access with an end-user and/or user account.

At 508, the IGS acquires compliance status for the end-user device. The compliance status can be in the form of individual compliance attributes and the compliance attributes can be acquired directly from the end-user device by the IGS (or, a component of the computing system). Alternatively, at 508, an IGS can acquire compliance status (or, compliance attributes) from, for example, a record of previously determined compliance status for the end-user device, which can be included in information regarding the end-user or user account determined at 506. In some embodiment, at 508, an IGS compares compliance attributes acquired from the end-user device to compliance attributes included in a record of previously acquired compliance attributes for that end-user device. At 510, an IGS optionally records or updates a previously recorded compliance status to reflect compliance attributes acquired from the device at 508.

At 512, the IGS continues to process the end-user access, according to the particular objectives of that access. For example, the end-user access may be to access, or to request access to, a provisioned resource. Alternatively, the end-user access may be to establish a user account for the end-user, or to establish credentials for accessing the computing system or a provisioned-resource of the computing system. Processing the end-user access, at 512, can involve an identity and governance (or, other resource management) operation, which can further require the IGS (or a management function of a computing system) to evaluate the end-user device compliance status. In some embodiments, the IGS, at 512, processes the end-user access using, for example, end-user device compliance status determined at 508, or an end-user compliance status recorded previously or at 510.

Figure 6:
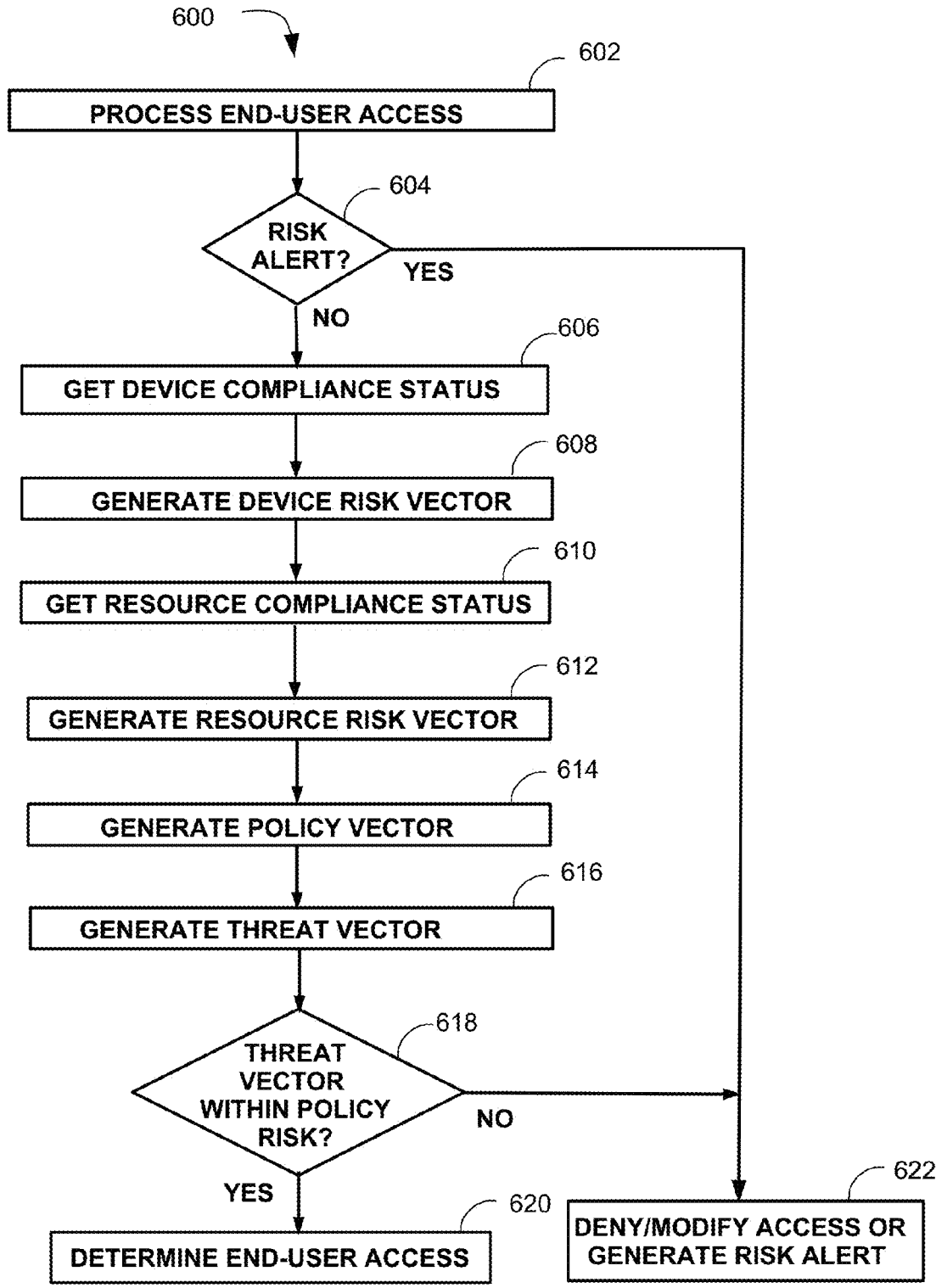
FIG. 6 is a flow diagram that depicts an example method to determine an end-user access level, according to embodiments of the disclosure.

FIG. 6 illustrates an example method (600) to evaluate risk of an end-user accessing a provisioned-resource with a particular end-user device. The method can be used in a variety of identity and governance operations regarding an end-user, end-user device, and/or user account access to a computing system or resources thereof. For example, the method can be performed as part of an end-user initiating or requesting access to a computing system or a provisioned-resource of the computing system; as part of granting an end-user access, or determining access permissions, to a provisioned-resource; or, as part of generating or responding to a risk alert associated with an end-user and/or end-user device.

In embodiment, the method can be performed as part of analyzing security or damage risks (for example) posed by an end-user device, or as part of determining risk posed by end-user according to the end-user role within an organization and having access to the computing system or provisioned resources. In some embodiment, the method can be performed (for example) as part of certifying, or re-certifying, access by an end-user, end-user device, and/or user account to a computing system or provisioned-resource thereof. Embodiments can perform the method to determine that a particular end-user device poses a particular risk to a computing system, or provisioned-resource thereof, in regard to the combination of compliance attributes of a particular end-user device and the provisioned-resource.

While these provide examples of various identity and governance operations that can employ the method, these are not limiting to embodiments and it would be apparent to one of ordinary skill in the art to apply the method to other identity and governance operations relating to an end-user accessing a provisioned-resource of a computing system.

For purposes of illustrating the method, but also not limiting embodiments, method 600 is described as performed by an IGS associated with (as, for example, in communication with, or included in) a computing system (such as computing system 100 of FIG. 1 and/or computer 200 of FIG. 2) having one or more provisioned resources (or, services). At 602 the IGS, an end-user, and/or a component of the computing system (or, a device connected to the computing system) initiates processing an end-user access (or any of the foregoing example identity and governance operations). In some embodiments, processing the end-user access is in response to a component of the computing system, or an IGS, detecting an end-user attempting to access the computing system or a provisioned-resource thereof. In other embodiments, processing an end-user access can be associated with various operations of an IGS (such as previously disclosed).

At 604 the IGS determines whether or not the end-user is associated with a risk alert. In embodiments, a risk alert can identify a particular end-user, end-user device, or user account posing a security or damage risk to the computing system. A risk alert can be generated by an IGS, can be generated by another component of a computing system, or generated by a computer (or computing system) in communication with a computing system providing provisioned-resources. A risk alert can be the result of processing a prior, or previous, end-user access.

If, at 604, the IGS determines that there is a risk alert associated with the end-user, or the end-user accessing the computing system or a particular provisioned-resource, at 622 the IGS, in this embodiment, denies the end-user access (or, request), modifies the end-user access permissions, renews the risk alert, and/or generates a new risk alert, for example. In alternative embodiments, an IGS omits 604 and evaluates the end-user for a previous or outstanding risk alert in combination, for example, with evaluating (at 606 through 618) the compliance status of an end-user device used by the end-user.

At 606, the IGS acquires, or otherwise obtains, device compliance status associated with an end-user device used to access a provisioned-resource, and at 608, the IGS generates a device risk vector (e.g., such as disclosed in FIG. 3). In an embodiment, an IGS can use compliance attributes in the device compliance status to form the device risk vector. The end-user device can be, for example, a device presently used by an end-user to access the computing system or a provisioned-resource, or can be a device associated with the end-user or user account intended to be used to perform the access. In some embodiments, an IGS can perform 606 and 608 for all, or a plurality, of the end-user devices associated with an end-user, and can generate a plurality of device risk vectors. In some embodiments, the IGS can generate a single device risk vector incorporating the compliance attributes of a plurality of the end-user devices.

If the end-user access (or, request) of 602 is associated with a particular provisioned-resource, at 610 the IGS acquires, or otherwise obtains, resource compliance status associated with the provisioned-resource. At 612, the IGS generates a resource risk vector (e.g., such as disclosed in FIG. 3) using compliance attributes in the resource compliance status. If, on the other hand, the end-user access of 602 is not an access or request directed at a particular provisioned-resource, the IGS can omit performing 610 and 612. For example, the end-user access can be a request to establish or modify a user account associated with the end-user, or an IGS operation to determine risks posed by the end-user according to an organizational role, and an IGS can omit 610 and 612. In some embodiments, an IGS can perform 610 and 612 for all, or a plurality, of the provisioned-resources accessed an end-user, generating a plurality of resource risk vectors (or, a combined resource risk vector incorporating the compliance attributes of a plurality of the provisioned-resources).

At 616, the IGS generates a compliance policy vector, such as policy vector 348 disclosed in FIG. 3. As previously disclosed, a compliance policy vector can incorporate security compliance attributes representing acceptable system security risk boundaries of compliance attributes of end-user devices and/or provisioned-resources. For example, the IGS can generate the policy vector in a manner such as disclosed with reference to FIG. 3.

At 616, the IGS generates a threat vector, such as threat vector 450 disclosed in reference to FIG. 4. A threat vector can incorporate compliance attributes of the device risk vector(s), the resource risk vector(s), the policy vector, or a combination thereof. For example, the IGS can generate the threat vector in a manner such as disclosed with reference to FIG. 4. An IGS, at 616, can include a plurality of device risk vectors, resource risk vectors, and/or policy vectors, in forming a threat vector.

At 618, the IGS evaluates the threat vector to determine if the end-user access poses a threat to the computing system or a component thereof (e.g., poses a security or damage risk). The presence of malware on an end-user device associated with the device risk vector may be, for example, not within the accepted risk level of the computing system. The presence, or absence, of a patch-level (or, software version or hardware type/model) on one, or both, of the end-user device and the provisioned resource, for example, can pose a security or damage threat to the computing system. A threat vector can include a vulnerability that poses, for example, an unacceptable security or damage risk to the computing system.

It would be apparent to one of ordinary skill in that art, and within the scope of the disclosure, that an IGS can evaluate a threat vector according to a variety of methods and using a variety of criteria to determine that attributes included in a threat vector are, or are not, within acceptable boundaries of risk. For example, the presence of any one or any particular combination of compliance attributes included in a threat vector can pose an unacceptable risk in an embodiment.

If, at 618, the IGS determines that the threat vector is within particular (e.g., acceptable) risk limits, at 620 the IGS determines an access level (e.g., access permissions) to assign to the end-user or end-user device(s), or a user account for access to particular provisioned-resources (or, the computing system as a whole). At 620, the IGS can determine an access level corresponding to the evaluation of the threat vector in 618, and according to the manner, or degree, in which the device and/or resource compliance attributes are within acceptable risk limits of the compliance policy (e.g., as represented by a policy vector). An IGS can determine an access level, or modify an existing access level, for a particular end-user device, a particular subset of end-user devices, or all end-user devices used to access the computing system or provisioned-resources thereof.

At 620, an IGS can determine or modify an access level for a particular provisioned-resource, or for a subset or all of the provisioned-resources accessed by the end-user or associated with an end-user user account. The access level can be applied to a particular end-user device, a particular subset of end-user devices, or all end-user devices used to access the computing system or provisioned-resources thereof. The determination, at 620, can be in relation to a role mining operation of the IGS, or in which the IGS participates, and the IGS can determine an end-user access level according to the role of the end-user within an organization.

Alternatively, if at 618 the IGS determines that the threat vector includes compliance attributes of end-user devices or provisioned-resources pose a risk of damage, loss, or security breach (for example), at 622 the IGS can, for example, deny the end-user access (or, request), modify the end-user access permissions, or renew an outstanding risk alert or generate a new risk alert. An IGS, or a computing system, can retain a previously generated risk alert for subsequent attempts by the end-user to access the computing system or a provisioned-resource.

An IGS (or, a computing system or component thereof) can generate a risk alert in a variety of identity and governance operations. In some embodiments, an IGS can determine, or generate, compliance risk alerts as part of, or in relation to, a "risk campaign". A risk campaign can be an evaluation of the risks of various end-users, end-user devices, or user accounts and can be performed in relation to the foregoing having access to a computing system or one or more resources or services (e.g., provisioned-resources) of a computing system. A risk campaign can be performed periodically, or may be performed in relation to a particular incident, event, or end-user-access regarding a computing system or provisioned-resource.

Figure 7:
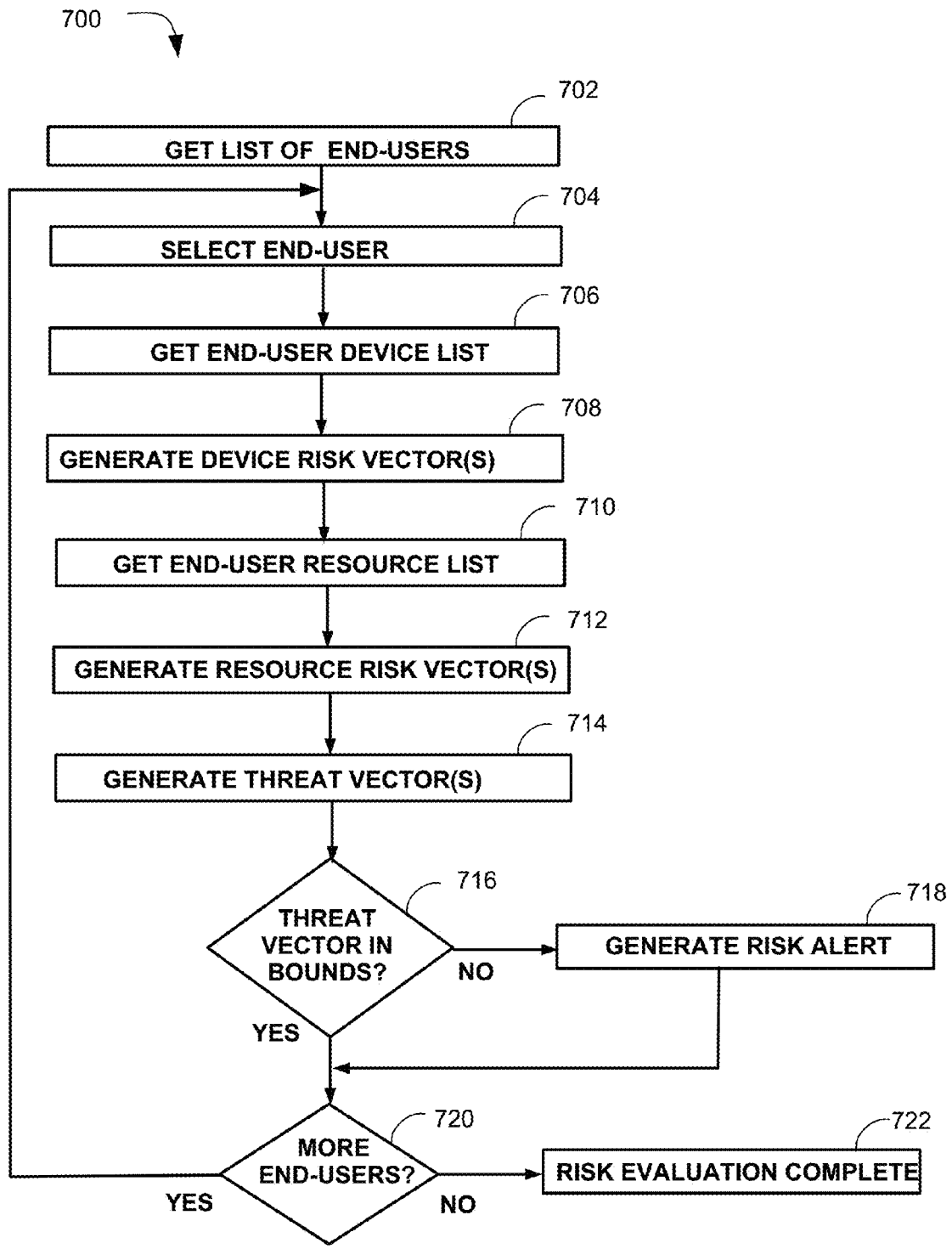
FIG. 7 is a flow diagram that depicts an example method to generate a risk alert, according to embodiments of the disclosure.

FIG. 7 illustrates an example method (700) to determine and generate a risk alert. For purposes of illustration, but not limiting embodiments, the method is described as performed by an IGS. However, it would be appreciated by one of ordinary skill in the art that the method can be performed by a component of an IGS, another component of a computing system having provisioned resources, or a component of a computer or computing system (such as computing system 100 of FIG. 1 and/or computer 200 of FIG. 2) in communication with a computing system having an IGS or provisioned resources.

The IGS initiates the method at 702 as part of, or in response to, a request to evaluate the risk of one or more end-users, and/or end-user devices or user accounts associated with each of the end-users. An IGS can initiate the method as part or in relation to performing another identity and governance operation, such as those example operations previously disclosed. At 702, the IGS determines end-users to evaluate (e.g., as part of a risk campaign) and, at 704, selects a first end-user.

At 706, the IGS determines the end-user devices used by or associated with the first end-user. At 708, for each end-user device, the IGS obtains the end-user device compliance attributes and generates a device risk vector. At 710, the IGS determines one or more provisioned-resources associated with (e.g., granted access to) the first end-user. At 712, for each resource, the IGS obtains the resource compliance attributes and generates a resource risk vector. In some embodiments, an IGS evaluates only risks associated with particular end-users, or end-user devices, independent of particular provisioned-resources used by or associated with an end-user. For example, an IGS can generate a threat vector utilizing only device risk vectors and policy vectors, and not including a provisioned-resource risk vector. Accordingly, an IGS can omit 710 and 712 generating resource risk vectors.

At 714, the IGS generates a threat vector, such as threat vector 450 of FIG. 4, incorporating the device risk vector(s), the resource risk vector(s), the policy vector, or a combination thereof. For example, the IGS can generate a threat vector in a manner such as disclosed with reference to FIG. 4. At 716, the IGS evaluates the threat vector, for example to determine whether the threat vector is within the boundaries of particular (e.g., acceptable) risk limits.

For example, a threat vector can represent that an end-user device software version is at or above a certain minimum version or patch-level. Correspondingly, an IGS can determine that the software version is within the computing system boundaries of acceptable risk (e.g., within a range of risk represented by a compliance policy, or compliance attributes included in a compliance policy). Alternatively, a threat vector can represent that an end-user device software version is below a certain minimum version or patch-level. Correspondingly, an IGS can determine that the software version is not within the computing system boundaries of acceptable risk.

In another example, a threat vector can represent that an end-user device is, or includes, a hardware type or model that is within an accepted set of hardware types or models (e.g., a set of authorized laptop computer, or mobile device, types or models). Correspondingly, an IGS can determine that the end-user device is within the computing system boundaries of acceptable risk. Alternatively, an end-user device may be, or include, a hardware type or model that is not within an accepted set of hardware types or models (e.g., an end-user device is a mobile device excluded from the set of end-user device types or models authorized to access the computing system or provisioned-resource). Accordingly, an IGS can determine that the end-user device is not within the computing system boundaries of acceptable risk.

It would be apparent to one of ordinary skill in that art, and within the scope of the disclosure, that an IGS can generate a threat vector incorporating compliance attributes of an end-user device, a provisioned-resource, and/or compliance attributes included in a compliance policy in a variety of manners. It would be further apparent to one of ordinary skill in that art, and within the scope of the disclosure, that an IGS can evaluate a threat vector in a variety of manners, or using a variety of algorithms or formulas, other than the examples of the disclosure.

If, at 716, the IGS determines that an end-user device (or a set of devices) poses an un-acceptable risk to the computing system or the provisioned-resource(s), at 718 the IGS generates a risk alert. Alternatively, if at 716 the IGS determines that an end-user device (or a set of devices) poses an acceptable risk, but that particular attributes (e.g., particular vulnerabilities) within the threat vector, nonetheless, merit or require the IGS to generate a risk alert corresponding to, or including, those attributes, then the IGS generates a risk alert at 718.

A risk alert can include compliance attributes corresponding to the end-user accessing the computing system or provisioned-resources of the computing system. A risk alert can include particular risk factors corresponding to the compliance attributes included in a threat vector. For example, a risk alert can include that an end-user device includes particular vulnerabilities and these vulnerabilities can be associated with particular probabilities that the end-user device can cause damage, loss, or breach of security to a provisioned-resource or to the computing system.

An IGS, or a computing system, can retain a risk alert for subsequent attempts by an end-user to access the computing system or a provisioned-resource. While not shown in the example method 700, at 718, the IGS can further deny access, or modify an existing access level for an end-user, end-user device, or user account according to the particular attributes included in a threat vector (or, included in device compliance status, for example).

If, at 716, the IGS determines that the end-user device(s) poses an acceptable risk to the computing system or the provisioned-resource(s) or, subsequent to generating a risk alert at 718, the IGS determines, at 720, if there are additional end-users to evaluate. If so, the IGS, at 704, selects another end-user and repeats 706 through 720. If there are no additional end-users to evaluate, at 722 the IGS determines that the risk evaluation is complete and concludes the method. In concluding the method, an IGS can communicate the risk alert to components of the computing system, or to another computer or computing system in communication with the IGS or the computing system for which the end-user(s) has (or, have) access. Concluding the method can include the IGS retaining the risk alert to evaluate subsequent end-user accesses or requests (e.g., such as at 604 of method 600). An IGS can notify, or a computing system or provisioned-resource can notify, for example, a system administrator for the computing system, or for a provisioned-resource, of the risks posed and the end-user(s) posing those risks.

It would be apparent to one of ordinary skill in the art that there are a variety of other actions an IGS, a computing system, or a provisioned-resource can take in relation to a risk alert, or in relation to determining, at 716, that a threat vector represents a risk to the computing system or provisioned-resource(s).

Method 700 is illustrated as performed with a plurality of end-users and provisioned-resources. However, it will be appreciated by one of ordinary skill in the art that the method may be performed in relation to a particular end-user, end-user device, user account, or provisioned-resource accessed by an end-user, end-user device, or associated with a particular user account. It will also be will be appreciated by one of ordinary skill in the art that 708 through 718 of method 700 can be performed at 622 of method 600 to determine or generate a risk alert.

Figure 8:
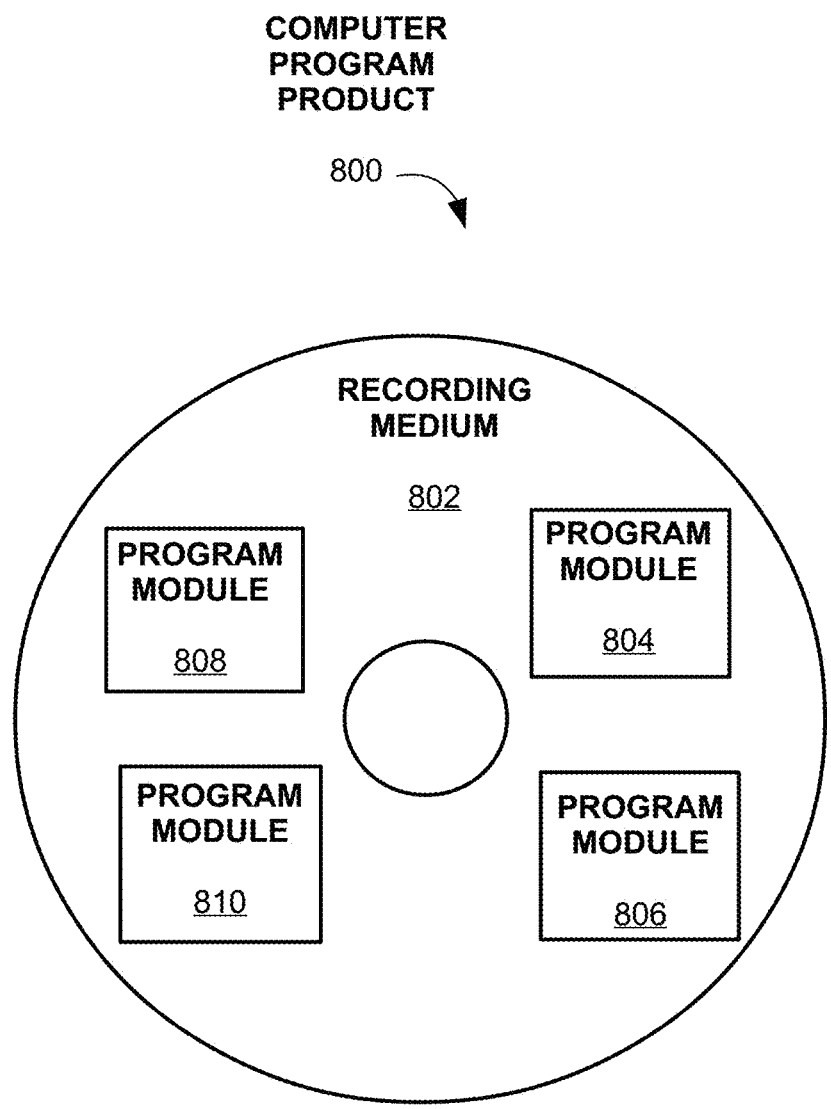
FIG. 8 is a block diagram illustrating an example computer program product that embodies embodiments of the disclosure.

FIG. 8 depicts an article of manufacture or computer program product 800 that is an embodiment of the invention. The computer program product 800 may include a recording medium 802, and the recording medium 802 may store program modules 804, 806, 808, and 810 for a computer to carry out the aspects of the invention. The recording medium 802 may be a CD ROM, DVD, tape, diskette, non-volatile or flash memory, storage medium accessed by a network connection, or other similar computer readable medium for containing a program product.

A sequence of program instructions within, or an assembly of one or more interrelated modules defined by, the program modules 804, 806, 808, and 810 may direct a computer to implement the aspects of the invention including, but not limited to, the structures and operations illustrated in and described in the present disclosure.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause the computer, other programmable apparatus, or other device to perform a series of operational steps to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer program product for managing a provisioned-resource, wherein the provisioned-resource is included in a computing system, wherein an end-user device is configured for use by an end-user to access the provisioned-resource, wherein the computer program product comprises a computer readable storage medium having program instructions embodied therewith, and wherein the program instructions are executable by a first computing device to perform a method, the method comprising:
   forming a device risk vector for the end-user device, the device risk vector including at least one device risk attribute, wherein the at least one device risk attribute is an attribute of the end-user device, is included in a device compliance status associated with the end-user device, and includes a device malware infection status, a device patch level, and a device vulnerability;
   forming a resource risk vector for the provisioned resource, the resource risk vector including at least one resource risk attribute, wherein the at least one resource risk attribute is an attribute of the provisioned-resource, is included in a resource compliance status associated with the provisioned-resource, and includes a resource malware infection status, a resource patch level, and a resource vulnerability;
   forming a policy vector, the policy vector including at least one security compliance attribute, and wherein the at least one security compliance attribute represents an access risk boundary associated with the end-user device accessing the provisioned-resource;
   forming a threat vector, the threat vector including at least one system risk attribute, wherein the at least one system risk attribute is based, at least in part, on comparing the device risk vector and the resource risk vector to the policy vector, and wherein the at least one system risk attribute comprises the at least one device risk attribute, the at least one resource risk attribute, and the at least one security compliance attribute;
   communicating a compliance alert in response to the at least one system risk attribute included in the threat vector exceeding the at least one security compliance attribute, wherein the compliance alert comprises at least identifying the end-user or the end-user device as posing a security risk to the computing system; and
   performing an access management operation including determining an access-level, wherein the access-level is associated with access to the provisioned-resource by at least one of the end-user, the end-user device, and a user account, wherein the user account is associated with the end-user, and wherein the determining the access-level is based, at least in part, on the at least one system risk attribute included in the threat vector,
   wherein the access management operation is included in:
   provisioning the provisioned-resource to at least one of the end-user, the end-user device, and the user account;
   certifying the at least one of the end-user, the end-user device, and the user account for the access to the provisioned-resource;

determining whether the access to the provisioned-resource by the at least one of the end-user, the end-user device, and the user account is within acceptable system security risk boundaries;

suspending the at least one of the end-user, the end-user device, and the user account from the access to the provisioned-resource;

determining an organizational role classification associated with the at least one of the end-user, the end-user device, and the user account; and in response to the at least one system risk attribute included in the threat vector exceeding the at least one security compliance attribute, modifying the access level for at least one of the end-user, the end-user device, and the user account according to particular attributes included within the threat vector.

* * * * *